United States Patent [19]
Becker et al.

[11] Patent Number: 4,695,349
[45] Date of Patent: Sep. 22, 1987

[54] PROCESS AND APPARATUS FOR DISTILLATION AND/OR STRIPPING

[75] Inventors: Hans Becker, Munich; Gerhard Linde, Grünwald, both of Fed. Rep. of Germany

[73] Assignee: Linde Aktiengesellschaft, Wiesbaden, Fed. Rep. of Germany

[21] Appl. No.: 709,247

[22] Filed: Mar. 7, 1985

[30] Foreign Application Priority Data

Mar. 7, 1984 [DE] Fed. Rep. of Germany ....... 3436021

[51] Int. Cl.⁴ ............................................. B01D 3/14
[52] U.S. Cl. ....................................... 203/26; 203/96; 203/97; 203/98; 203/DIG. 4; 203/DIG. 14; 203/DIG. 25; 202/235; 202/185 A; 159/17.3; 159/24.3; 159/DIG. 8; 159/DIG. 32; 62/324.1; 62/501
[58] Field of Search ................... 203/26, 96, DIG. 14, 203/DIG. 4, 91-94, DIG. 25, 97, 98; 202/185.1, 235; 159/17.3, 24.2, 24.3, DIG. 8, DIG. 32; 62/501, 324.1, 498; 165/2, 58, 60

[56] References Cited

U.S. PATENT DOCUMENTS

| | | | |
|---|---|---|---|
| 2,509,136 | 5/1950 | Cornell | 203/26 |
| 2,615,833 | 10/1952 | Dean et al. | 203/DIG. 14 |
| 2,619,814 | 12/1952 | Kniel | 203/26 |
| 3,423,293 | 1/1969 | Holden | 203/26 |
| 3,677,905 | 7/1972 | Brown | 159/DIG. 39 |
| 3,766,020 | 10/1973 | Sieder | 203/26 |
| 3,796,640 | 3/1974 | Boomer | 203/26 |
| 3,856,632 | 12/1974 | Peter | 203/26 |
| 3,875,019 | 4/1975 | Cocuzza et al. | 203/26 |
| 3,962,404 | 6/1976 | Giammarco et al. | 203/96 |
| 4,023,946 | 5/1977 | Schwartzman | 203/26 |
| 4,177,137 | 12/1979 | Kruse | 203/26 |
| 4,277,268 | 7/1981 | Spangler, Jr. | 203/26 |
| 4,309,254 | 1/1982 | Dahlstrom et al. | 203/19 |
| 4,347,385 | 8/1982 | Scoggin | 203/DIG. 14 |
| 4,357,153 | 11/1982 | Erickson | 203/26 |
| 4,375,387 | 3/1983 | de Filippi et al. | 203/26 |
| 4,444,571 | 4/1984 | Matson | 55/16 |
| 4,471,619 | 9/1984 | Nolley, Jr. | 203/DIG. 20 |

FOREIGN PATENT DOCUMENTS 0823339 11/1959 United Kingdom ................ 203/26

OTHER PUBLICATIONS

Chem. Eng., Sep. 26, 1977, Petterson et al., "Energy-Saving Schemes in Distillation", pp. 78-86.

*Primary Examiner*—Kenneth M. Schor
*Assistant Examiner*—V. Manoharan
*Attorney, Agent, or Firm*—Millen & White

[57] ABSTRACT

A process is disclosed for distillation and/or stripping in a column, the lower portion of which is heated and the upper portion of which is cooled. The heating and cooling facilities thereof are coupled with each other by means of a heat pump system. In order to reduce the energy input, the invention provides for driving the heat pump system by means of expansion of a gas or vapor, and with the gas or vapor, after expansion, utilized as the stripping gas in the column.

11 Claims, 2 Drawing Figures

PROCESS AND APPARATUS FOR DISTILLATION AND/OR STRIPPING

BACKGROUND OF THE INVENTION

This invention relates to a process and apparatus for conducting distillation and/or stripping in a column of the type wherein the lower portion or sump of the column is heated and the upper portion or head is cooled, and with the heating and cooling means interconnected and operatively coupled with each other by means of a heat pump system. Such processes and apparatus are well known and described many times in text books as well as in journals, e.g. Chem Eng. Sept. 26, 1977, pages 78 to 86.

It is known that introducing a stripping gas or vapor to the lower portion of a column lowers the partial pressure within the column and simultaneously reduces the temperature in the column. This effect thus created is often utilized for the careful separation of materials or substances by distillation, as well as for the regenerating by stripping of a scrubbing agent in various chemical and physical washing operations. As the stripping gas or vapour, steam is often utilized to provide special advantages in such operations. More particularly, the steam can either be blown directly into the sump of the column, during distillation or stripping, or, if the column feed initially contains water, it can be generated by external heating of the column sump. Occasionally, both uses of the steam are combined. In these processes, the sump heater and the head cooler of the column can be connected and operatively coupled with each other in a conventional manner by means of a heat pump arrangement.

SUMMARY OF THE INVENTION

It is thus an object of the invention to provide a process of the type discussed above requiring substantially less energy input than the prior art processes of the type discussed.

It is another object of the present invention to provide an apparatus of the above discussed type constructed for reducing energy consumption when employed to conduct such a process.

Upon further study of the specification and appended claims, further objects and advantages of this invention will become apparent to those skilled in the art.

In accordance with the invention, a process for conducting distillation and/or stripping in a column is provided wherein the lower portion or sump of the column is heated and the upper portion is cooled with a heated vapor being passed from the sump of the column upwardly countercurrent to contact a downward flow of cooler feed components, such as a scrubbing liquid loaded with impurities, to effect separation of the components of the feed. In such a process the heating and cooling means for the sump and the head of the column can be coupled, i.e., interconnected, by means of a heat pump system. The improvement resides in that the heat pump system is driven by expansion of a gas or vapor, with the gas or vapor after being expanded to power the heat pump system, employed as stripping gas in the column.

In distillation processes the heat requirements in the sump of the column must satisfy, in general, three components, i.e., heating up the liquid to sump temperature, supply energy for separation of feed components, and generation of stripping vapor. As compared with these general processes, in accordance with the invention, a heat pump system is utilized, for example, connected in line between the column head and the sump. The heat pump system is driven by means of expansion, for example, by means of a turbine powered by an externally supplied gas or vapor and the gas or vapor is utilized, after undergoing expansion, through, for example, the turbine, as the stripping gas being passed upwardly from the sump in the column. By conducting the process in this manner, a considerable reduction of the required energy input is achieved.

It has proven to be especially advantageous, in this connection, to use steam as the gas or vapor employed for driving the heat pump system by expansion. This steam is often suitable for use as a stripping gas in the column.

Although steam is especially advantageous, the use of the invention is not restricted to the application of steam. Any other condensible vapor or vaporizable liquid which is suitable for the specific separation problem can be used, like e.g. methanol in amine based sweetening processes.

According to a more specific embodiment of the process of this invention, the heat pump system is operated as a closed system with its own operating medium.

If steam is used as a stripping gas and if the column is operated close to atmospheric pressure then a suitable operating medium for the heat pump system is, for example, the refrigerant R 11 (C Cl$_3$F also known as Freon 11, registered trademark by Du Pont de Nemours) for its high critical temperature of 471 K. Using other stripping media and/or column pressures, other refrigerants like e.g. hydrocarbons might be more advantageous.

It is also possible to operate the heat pump system as an "open" system, utilizing as its operating medium the gas leaving the column head. When such a gas is employed, it is known as tower overhead vapor compression. In accordance with this embodiment the heat pump operation is executed with this version of the process. Such vapor compression can be conducted conventionally by means of a compressor as well as with an ejector (sometimes also referred as "jet compressor").

In the former case, the compressor will be driven preferably by an expansion turbine, the exhaust of which is conducted into the sump of the column and is thus utilized as the stripping gas, whilst the thus compressed vapors provide heating to the sump by means of a heat exchanger.

In the latter case, it is advantageous to withdraw a partial stream of the vapor condensed in the head cooling unit of the column, expand same, and reuse it by vaporizing it in a conventional manner in the column head for cooling the column head. The revaporized stream is compressed by means of an ejector, and the vapors are fed, together with the driving gas for the ejector, to the column sump and utilized combined as stripping gas. Applying this version of conducting the process of vapor jet compression, a substantial reduction in vapor consumption can be achieved, which manifests itself especially in a reduction in the initial investment costs.

According to still another embodiment of the process of the invention, additional heat from the sump product is fed by heat exchange to the heat pump system, and the sump product is cooled thereby. This measure is expedient, in particular, if the sump product is to be further cooled before being discharged, which is the case for example in some chemical scrubbing processes like e.g. the hot potassium sour gas removal process.

Another lowering in energy requirements can be obtained by a stepwise utilization of the heat pump system. In this process, cooling and/or heating of the column can be performed in several stages, i.e., the heat pump system transmits or receives heat at several temperature levels. The basic ideas of such systems are described to some detail in the cited literature. In any case a multi stage compressor has to be used to realise such a stepwise heat pump. According to the disclosed invention, the compressor is driven by a turbine and the turbine exhaust is used as a stripping medium in the column.

In addition to the process, the invention also relates to an apparatus for performing the process. The apparatus includes generally a column, sump heating and head cooling facilities which are coupled to each other by means of a heat pump in a known manner. The apparatus of the invention includes an improvement, in that the heat pump is connected to a gas or vapor device which provides the driving energy to the heat pump system. More particularly, the heat pump system of the invention can operate as a closed system or, alternatively, as an open system. In the latter case, the heat pump system is connected through a conduit with the head of the column or the head condenser thereof. Preferably, the gas or vapor expansion device is an expansion turbine, for example, and is connected through an exhaust pipe to the lower portion of the column.

Alternatively, when using an open system, the expansion device can also be an ejector as previously discussed. In this case it is also advantageous to provide the column with a liquid barrier below the head cooling facility. Such liquid barriers are conventional.

In addition, the heat pump system can be connected for heat exchange, if a closed system is used, with the product conduit for the sump product as discussed above with reference to the process.

The mode of operation of the process according to this invention, as well as the apparatus, can be utilized with advantage in the regeneration of scrubbing agents from physical or chemical washing operations.

BRIEF DESCRIPTION OF THE DRAWINGS

Various other objects, features and attendant advantages of the present invention will be more fully appreciated as the same becomes better understood when considered in connection with the accompanying drawings, wherein.

DETAILED DISCUSSION OF THE INVENTION

Figure 1:
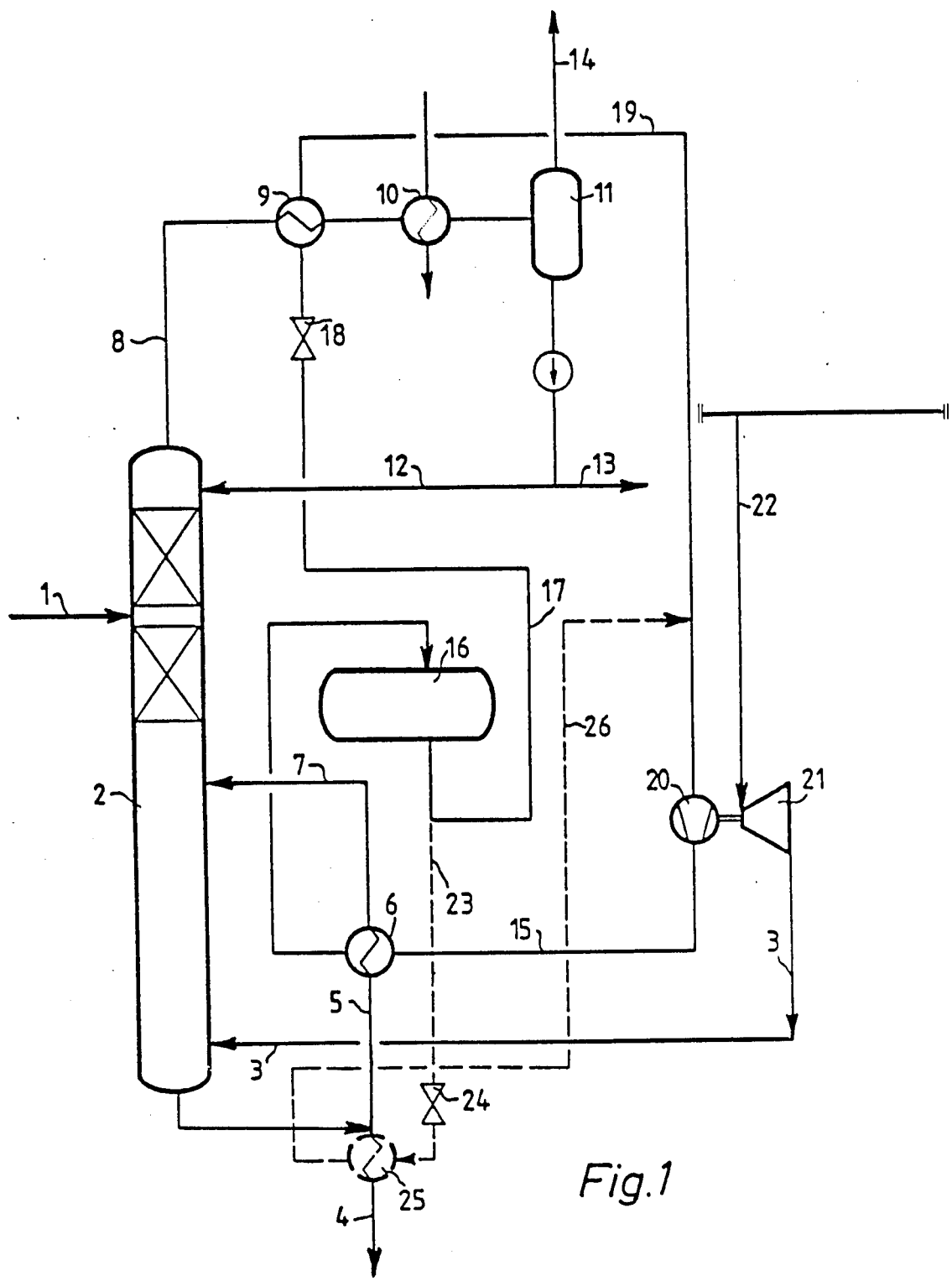
FIG. 1 schematically illustrates a system for conducting a steam distillation wherein a heat pump system is utilized having an auxiliary circulation system to provide heating/cooling.

In FIG. 1, a multi-component stream is supplied through a conduit 1 to a distillation column 2. This feed stream can be typically either a solvent loaded with absorbed impurities, or a mixture of substances to be separated as discussed above.

In the illustrated embodiment of FIG. 1, a partial stream of the required stripping vapor, in this case steam, is introduced into the distillation column through a conduit 3 in the lower portion thereof. The other part of the stripping vapor is generated (as described below) by partial vaporization in heat exchanger 6.

This stripping vapor separates in countercurrent action, substances to be removed from the feed stream and carries them with it to the head of the column. For example, such a process can involve separation of $SO_2$ from a feed stream of 900 t/h of tetraethylene glycol dimethyl ether. This scrubbing agent is loaded with $SO_2$ in a flue gas desulfurization plant and fed at a temperature of 95° C. to the column, which is operated at 0.6 bar. The $SO_2$ is stripped out of the feed stream by means of a stripping steam (flow rate 15 t/h), passed countercurrently to the feed stream. The scrubbing agent, thus freed of $SO_2$, leaves the column 2 through conduit 4 at a temperature of 100° C. and under a pressure of 0.6 bar.

A partial stream of the liquid discharged from the sump is withdrawn through conduit 5 from the lower portion of the distillation column, heated in a heat exchanger 6 acting as a conventional thermosyphon, partially vaporized, and returned into the column through conduit 7. The thusproduced vapor contributes to the total stripping vapor and thus improves the stripping and/or distillation effect.

The stripping vapor, loaded with $SO_2$, is withdrawn through conduit 8, cooled in a heat exchanger 9 in heat exchange with the circulating medium of the heat pump system to about 65° C., then in heat exchange with cooling water in a cooler 10 to about 30° C., and fed into a separator 11. The most advantageous values for the temperatures after cooler 9 and 10 depend on the operating pressure of the column as well as on the medium used for stripping. They have to be evaluated individually for each example. The condensed stripping system is withdrawn at the bottom from separator 11 through the recycle line 12 and introduced in part to the head of the distillation column as reflux at that location. The flow of the other part is given by the water balance of the column. It is discharged as excess water through conduit 13. The head product, i.e. the separated $SO_2$, is withdrawn from the upper portion of separator 11 in this example in an amount about 22.3 kmol/h through conduit 14. The $SO_2$ thus withdrawn also will contain an amount of steam in correspondence with the temperature and pressure in the separator 11, e.g. assuming a temperature of 30° like in the example, then the water vapor pressure is 0.0424 bar and further assuming a pressure of 0.55 bar then the concentration of steam in stream 14 is 7.7%.

The sump heating of the distillation column is operated in heat exchanger 6 by means of heat exchange with the cycle medium (R 11). The cycle medium is passed at a rate of 45 kg/sc, is condensed during this step at approx. 10 bar and fed to a collector 16 at a temperature of 110° C. The condensate is passed through conduit 17, throttled by valve 18 to about 4.5 bar and then vaporized in heat exchanger 9, and fed as a vapor through conduit 19 to a compressor 20. The vapor is compressed to about 10.5 bar, is again fed through conduit 15 to heat exchanger 6 and recondensed.

The compressor 20 is powered, according to this invention, by a steam turbine 21 which, in turn, is driven with medium-pressure steam, at a rate, pressue and temperature, respectively, of 10 t/h, 30 bar, 300° C., through conduit 22. The output side of the turbine 21 is connected to the sump of the distillation column by means of the exhaust pipe 3, so that the turbine exhaust can be utilized, at a temperature of 86° C., a pressure of 0.6 bar, as stripping vapor in the column.

In processes conventionally operating with steam heating of the column sump, about 20 t/h of steam is required for heating the column sump, as compared with the process of this invention, which requires merely 10 t/h of steam.

In the illustrated embodiment, there is also the possibility, as illustrated in dashed lines, of branching off a portion, as required for cooling the bottom product, of the condensed cycle medium through conduit 23, throttling it in a valve 24, and, after vaporizing in heat exchanger 25, conducting same through conduit 26 into the inlet of the compressor. Heat exchange will then take place against sump product. This variation offers the advantage that the heat content of the sump product can likewise be exploited, by means of the heat pump system, for heating the column.

Figure 2:
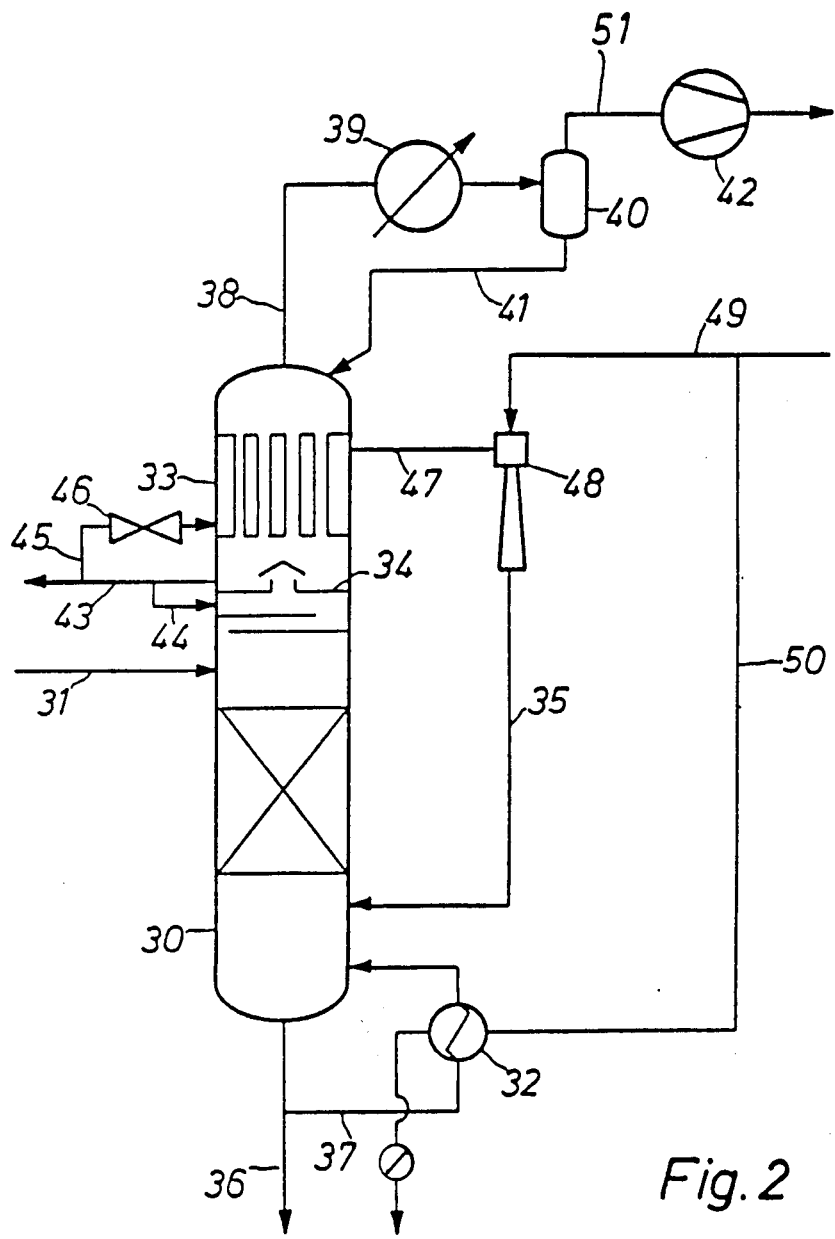
FIG. 2 schematically illustrates a regeneration system wherein a vapor compression by an ejector is utilized for regeneration of a scrubbing agent.

In accordance with the embodiment of FIG. 2, a distillation column 30 operated at 0.6 bar, is fed, through a conduit 31, with 850 t/h of a physical scrubbing medium loaded with impurities, for example, tetraethylene glycol dimethyl ether loaded with $SO_2$, at a temperature of 95° C. The distillation column 30 is equipped with a sump heater 32 and head cooling units 33 and 39 in a conventional manner. The head cooler 33 is a typical condenser-evaporator. Below the head cooling facility there is a liquid barrier 34 arranged, for example, a chimney tray.

In the illustrated embodiment, 8.5 t/h of vapor, i.e., steam is introduced into the distillation column in the lower portion thereof through conduit 35 at a temperature of 115° C. and under a pressure of 0.6 bar. In the sump of the column, the temperature is maintained at about 100° C. at a pressure of about 0.6 bar, so that the $SO_2$ can be stripped out of the solvent by means of the superheated vapor. The solvent, freed in this way of $SO_2$, is discharged from the sump of the column through conduit 36 at a temperature of about 100° C. and under a pressure of 0.6 bar. A partial stream of regenerated solvent is passed through conduit 37, to the sump heater 32 partially vaporized and returned into the column thus providing an additional vapor for stripping.

The $SO_2$-loaded steam is then cooled in head cooler 33 to about 84° C., to condense 5.8 t/h of the steam, while a gaseous fraction of about 0.3 mol-% $CO_2$, 4.2 mol-% $SO_2$ and 95.5 mol-% $H_2O$ is withdrawn in an amount of 480 kmol/h overhead through conduit 38. This fraction is cooled to 30° C. in a cooler 39 in exchange with cooling water and introduced into a separator 40. From the latter, about 82 t/h of water is conducted through conduit 41, to the head of column 30 and, through conduit 51, about 20 kmol/h of a gaseous fraction consisting of about 7.9 mol-% $CO_2$, 83.1 mol-% $SO_2$ and 9.0 mol-% $H_2O$ is withdrawn and discharged after compression in compressor 42.

The total condensate, which accumulates on the chimney tray 34 i.e., about 14 t/h is removed from the column through conduit 43 above the liquid barrier 34. A part thereof, i.e., about 5.5 t/h, is reintroduced into the column through conduit 44 as reflux below the liquid barrier 34 while another part, i.e., about 5.1 t/h, is conducted through conduit 45, after throttling in valve 46, into the condenser-evaporator 33 to provide part of the cooling required at the top of the column. The condensate is again vaporized at a pressure of 0.42 bar and is removed by means of an ejector 48 through conduit 47, The remainder of the withdrawn condensate from the chimney tray 34 (3 t/h) is discharged, for example, for boiler feed water processing.

In the ejector 48, a vapor-jet device, the vapor from conduit 47 is compressed to 0.6 bar and introduced, together with the operating medium, i.e., about 3.4 t/h of saturated steam (e.g. 4.5 bar, 148° C.) from conduit 49, through conduit 35 into the lower portion of the column. A portion of the saturated steam from line 44, i.e., about 10.5 t/h is utilized through conduit 50 for boiling the solvent in heat exchanger 32 and thereafter discharged.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the fractionation of liquid involving introducing a gas or vapor as stripping medium to the lower portion of a column and heating the sump of the column and cooling the head of the column, with heating and cooling being effected with a heat pump system coupling the heating and cooling operations to each other, the improvement comprising driving the heat pump system by expansion of a gas or vapor, and after expansion of said gas or vapor, passing the expanded gas or vapor for use as said stripping medium in the column.

2. A process according to claim 1, wherein said gas or vapor is steam used for driving the heat pump system by expansion.

3. A process according to claim 1, wherein the gas or vapor is passed through a turbine which drives a compressor making up said heat pump system, and from said turbine, to the column sump as stripping medium.

4. A process according to claim 1, wherein the heat pump system is operated as a closed system with its own operating medium.

5. A process according to claim 2, wherein the heat pump system is operated as a closed system with its own operating medium.

6. A process according to claim 1, wherein the heat pump system is operated as an open system with vapor discharged from the head of the column utilized as the operating medium.

7. A process according to claim 2, wherein the heat pump system is operated as an open system with vapor discharged from the head of the column utilized as the operating medium.

8. A process according to claim 6, wherein a partial stream of the vapor condensed in a head cooling unit is withdrawn, throttled and reused by vaporizing said vapor in the column head for cooling the column head.

9. A process according to claim 8, wherein the condensed vapor withdrawn from the column head is after revaporization, compressed by an ejector and combined with gas or vapor used as jet stream in the ejector and passed as stripping medium to the column sump.

10. A process according to claim 1, wherein the heat pump medium is additionally heated in heat exchange with discharged sump product, and with the sump product being cooled off thereby.

11. A process according to claim 1, wherein the cooling and/or heating of the column is conducted in multiple stages.

* * * * *